United States Patent [19]

Orlando et al.

[11] Patent Number: 5,029,876
[45] Date of Patent: Jul. 9, 1991

[54] LABYRINTH SEAL SYSTEM

[75] Inventors: Robert J. Orlando, West Chester, Ohio; Paul B. Johnston, Jr., Schenectady, N.Y.

[73] Assignee: General Electric Company, Schenectady, N.Y.

[21] Appl. No.: 284,161

[22] Filed: Dec. 14, 1988

[51] Int. Cl.⁵ ............................................. F16J 15/447
[52] U.S. Cl. ........................................ 277/56; 277/55; 415/174.5
[58] Field of Search .................. 277/55, 56; 415/174.5

[56] References Cited

U.S. PATENT DOCUMENTS

| 1,794,747 | 3/1931 | Wiberg | 277/56 X |
| 2,123,818 | 7/1938 | Wegmann | 277/55 |
| 4,351,532 | 9/1982 | Laverty | 277/53 |

FOREIGN PATENT DOCUMENTS

| 1159227 | 12/1963 | Fed. Rep. of Germany | 277/55 |
| 169366 | 11/1959 | Sweden | 277/55 |
| 174155 | 3/1935 | Switzerland | 277/56 |

OTHER PUBLICATIONS

"The Leakage of Steam Through Labyrinth Seals", by Adolf Egli, Transactions of The American Society of Mechanical Engineers, Fuel and Steam Power, vol. 57. "Aerodynamic Performance of Conventional and Advanced Design Labyrinth Seals with Solid-Smooth, Abradable, and Honeycomb Lands", H. L. Stocker, D. M. Cox, G. F. Holle, NASA Lewis Research Center.

*Primary Examiner*—Allan N. Shoap
*Attorney, Agent, or Firm*—Nixon & Vanderhye

[57] ABSTRACT

A labyrinth seal system for reducing leakage flow of a compressible fluid between a rotating portion of a machine rotating relative to a stationary portion of the machine. A stator seal element is connected to the stationary portion of the machine and a rotor seal element is connected to the rotating portion of the machine. The rotor seal element defines a plurality of staggered cavities. Straight long teeth connected to the stator seal element define throttling clearances with the bottom walls of the staggered cavities of the rotor seal element, and short teeth connected to the stator seal element slanted upstream relative to the direction of leakage flow define throttling clearances with the rotor seal element. Undercuts can optionally be defined by the rotor seal element on the downstream side of the cavities. Optional straight teeth connected to the rotor seal element downstream of the cavities define throttling clearances with the stator seal element. The short teeth of the stator seal element can optionally be straight. Optionally all the teeth can be slanted in the direction of leakage flow. The configurations of the rotor seal element and the stator seal element can be reversed.

34 Claims, 11 Drawing Sheets

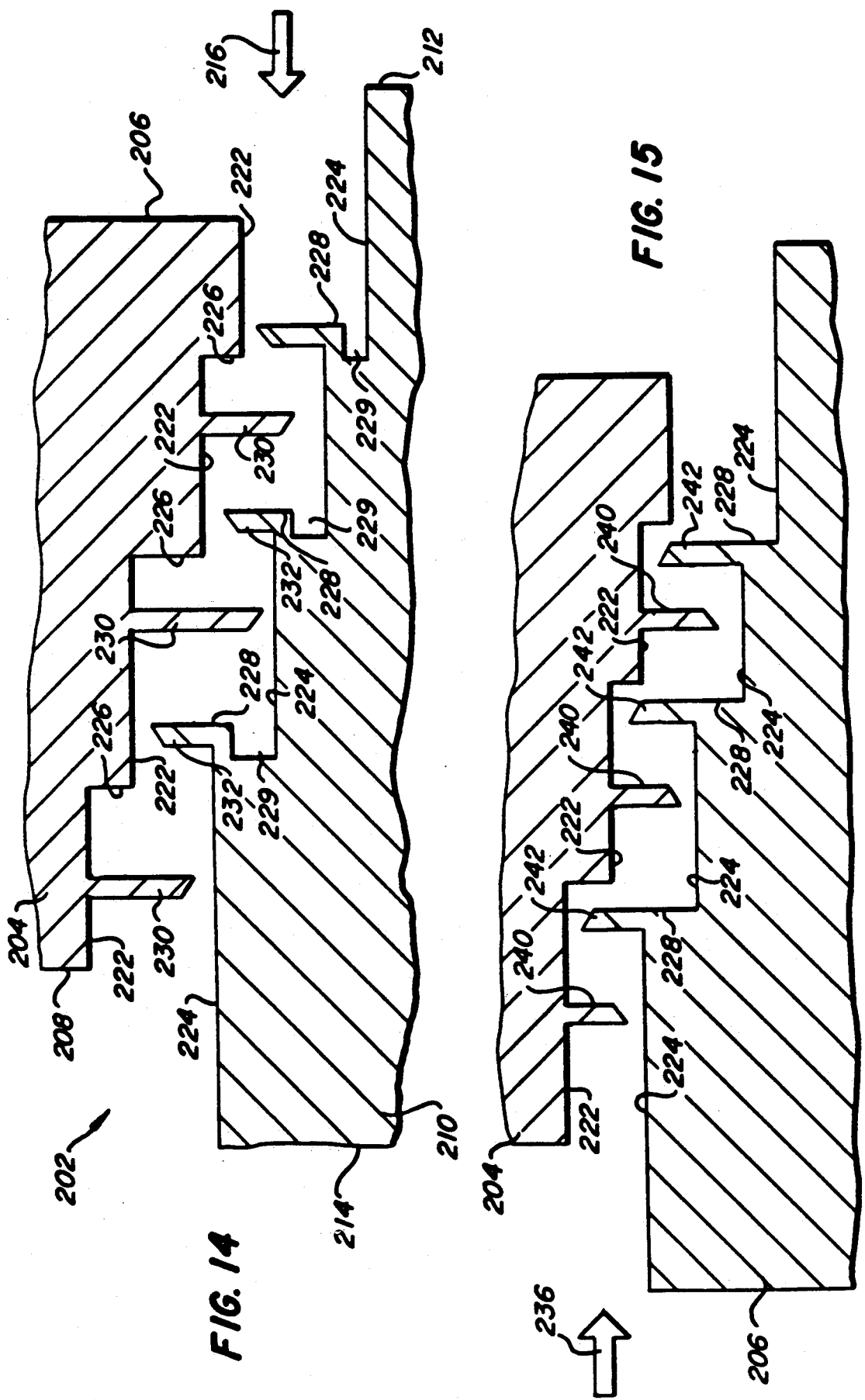

LABYRINTH SEAL SYSTEM

FIELD OF THE INVENTION

This invention relates generally to minimizing leakage loss of compressible fluid through labyrinth seals.

BACKGROUND OF THE INVENTION

The term labyrinth seal describes a packing, or seal, between a stationary portion, referred to as the land, or stator, and a rotating portion, or rotor, of a machine. The labryinth seal includes a series of regularly spaced teeth that extend around the rotor or stator. The teeth form a throttling clearance from the opposite wall. A gas or steam passes through the throttling clearance in a jet stream which impinges upon the following tooth so that turbulence is created in the gas or steam and kinetic energy is thus greatly reduced. Basic types of labyrinth packings, or seals, for steam turbines are summarized in a publication entitled "The Leakage of Steam Through Labyrinth Seals" by Adolf Egli in Transactions of The American Society of Mechanical Engineers, Fuel and Steam Power, vol. 57., pages 115-121, 1935. FIG. 8 therein schematically illustrates two types of straight-through-type labyrinth seals. FIG. 9 schematically illustrates two types of staggered-type labyrinth seals. A staggered seal is a type of seal having a series of cavities defined by an element of the labyrinth seal. The first type of staggered seal has upstream and downstream sides having the same diameters; the second type of staggered seal has upstream and downstream sides relative to the direction of leakage flow having different diameters. FIG. 1 of the present application reproduces the first type of the staggered-type labyrinth seal of FIG. 9 of the Egli publication.

New types of labyrinth seals are described in a study entitled "Aerodynamic Performance of Conventional and Advanced Design Labyrinth Seals With Solid-Smooth, Abradable, and Honeycomb Lands", by H. L. Stocker, D. M. Cox, and G. F. Holle, prepared for National Aeronautics and Space Administration, NASA Lewis Research Center, Contract NAS 3-20056, Nov., 1977. FIG. 72 on page 108 of the study schematically illustrates a stepped large-to-small diameter optimized advanced labyrinth seal configuration which includes four rotor-connected teeth slanted against the direction of flow of a gas or steam. FIG. 81 on page 117 of the study schematically illustrates a stepped small-to-large diameter optimized advanced labyrinth seal configuration which includes a notched land, or stator, and four rotor-connected teeth slanted in the direction of flow of a gas or steam. Prior art FIGS. 2 and 3 of the present application reproduces FIGS. 72 and 81, respectively of the NASA study. Prior art FIGS. 2 and 3 are essentially the same stepped labyrinth seal with the flow direction of the leakage fluid reversed and with the direction of the slant of the teeth likewise reversed. The experimental study showed that approximately a 20 percent improvement was obtained with the new type of slanted teeth seal. The improvement was in part dependent upon the small clearance between the rotor and the stator. Because of the proximity between the slanted teeth and the lip of the notches, application of the described new design would subject the seal to axial rubs during startup of a gas or steam turbine because of large and differentiated axial movements that occur during that time. This is especially true for a gas turbine, which can reach full load in about ten minutes. It is noted that the prevention of such axial rubs caused by the presence of slant teeth can be accomplished by increasing the axial length of the seal, which is an undesirable aspect of the new slanted teeth labyrinth seals.

One problem that exists relating to labyrinth seals and gas turbines is as follows. Cooling air extracted from the compressor is required in a modern gas turbine to maintain the turbine components within acceptable temperature limits in order that they maintain their mechanical integrity. Such extracted cooling air is supplied to the downstream, or rearward, side of the wheels. A small portion of this cooling air is intentionally leaked through a space between the stationary downstream nozzle and the rotating downstream spacer to the forward side of the following wheel. The intentional leakage flow through this space is restricted by a labyrinth seal formed by the downstream spacer and a diaphragm connected to the downstream nozzle. In the present art of the labyrinth seal, the amount of intentionally leaked cooling air exceeds that needed to cool the forward side of the following wheel. Because of this, excessive cooling flow is extracted from the compressor with the result that the output of the machine as a whole is reduced.

SUMMARY OF THE INVENTION

Accordingly, it is an object of this invention to provide a labyrinth seal which substantially reduces the amount of leakage flow of a compressible fluid between stationary and rotating parts of a machine.

It is another object of this invention to provide a labyrinth seal which substantially reduces the amount of leakage flow of a hot gas between stationary and rotating parts of a turbo-machine.

It is yet another object of this invention to provide a labyrinth seal which substantially reduces the amount of leakage flow of a compressible fluid between stationary and rotating parts of a machine without significant decrease in the axial clearance of the seal and without increase in the axial length of the seal.

It is still another object of this invention to provide a labyrinth seal which substantially reduces the amount of leakage flow of a compressible fluid between stationary and rotating parts of a machine by adding a number of teeth on the seal so as to substantially increase the number of throttlings of the seal without substantially decreasing the axial clearance of the seal and without increasing the axial length of the seal.

It is yet another object of this invention to provide a labyrinth seal which substantially reduces the amount of leakage flow of a compressible fluid between stationary and rotating parts of a machine by adding a number of teeth to both the seal rotor and the seal stator so as in increase the number of throttlings of both the seal rotor and the seal stator without substantially decreasing the axial clearance of the seal and without increasing the axial length of the seal.

In accordance with these and other objects which will become apparent hereinafter, there is provided a labyrinth seal system for reducing leakage flow of a compressible fluid between a rotating portion of a machine rotating relative to a stationary portion of the machine. A stator seal element is connected to the stationary portion of the machine and a rotor seal element is connected to the rotating portion of the machine. The rotor seal element defines a plurality of staggered cavities. Straight long teeth connected to the stator seal element define throttling clearances with the bottom walls of the staggered cavities of the rotor seal element, and short teeth connected to the stator seal element slanted upstream relative to the direction of leakage flow define throttling clearances with the rotor seal element. Undercuts can optionally be defined by the rotor seal element on the downstream side of the cavities. Optional straight teeth connected to the rotor seal element downstream of the cavities define throttling clearances with the stator seal element. The short teeth of the stator seal element can optionally be straight. Optionally all the teeth can be slanted in the direction of leakage flow. The configurations of the rotor seal element and the stator seal element can be reversed.

A test conducted in the laboratory on a scale air model of the prior art seal system illustrated in FIG. 1A, which is representative of the current configuration used in General Electric Company gas turbines, and on the inventive seal systems illustrated in FIGS. 6,, 7, 9, 10, 11, and 12. The percentage reductions in leakgage flow-through for each of the inventive seal systems as compared to the prior art seal system illustrated in FIG. 1A is shown in the following table:

TABLE

| Current Seal System | Inventive Seal System | Percentage Leakage Reduction |
| --- | --- | --- |
| FIG. 1A | FIG. 6 | 16 |
| FIG. 1A | FIG. 7 | 19 |
| FIG. 1A | FIG. 9 | 30 |
| FIG. 1A | FIG. 10 | 33 |
| FIG. 1A | FIG. 11 | 26 |
| FIG. 1A | FIG. 12 | 27 |

The present invention will be better understood and the main objects and important features, other than those enumerated above, will become apparent when consideration is given to the following details and description, which when taken in conjunction with the annexed drawings, describes, discloses, illustrates, and shows the preferred embodiments or modifications of the present invention and what is presently considered and believed to be the best mode of practice in the principles thereof. Other embodiments or modifications may be suggested to those having the benefit of the teachings herein. Such other embodiments or modifications are intended to be reserved especially as they fall within the scope and spirit of the subjoined claims.

BRIEF DESCRIPTION OF THE DRAWINGS

FIG. 14 illustrates in schematic cross-section a labyrinth seal with a downstream diameter larger than the upstream diameter including straight teeth and slanted teeth in phantom line; and FIG. 15 illustrates in schematic cross-section a labyrinth seal with as upstream diameter larger than the downstream diameter including straight teeth and slanted teeth in phantom line.

DESCRIPTION OF THE PREFERRED EMBODIMENTS

Figure 1:
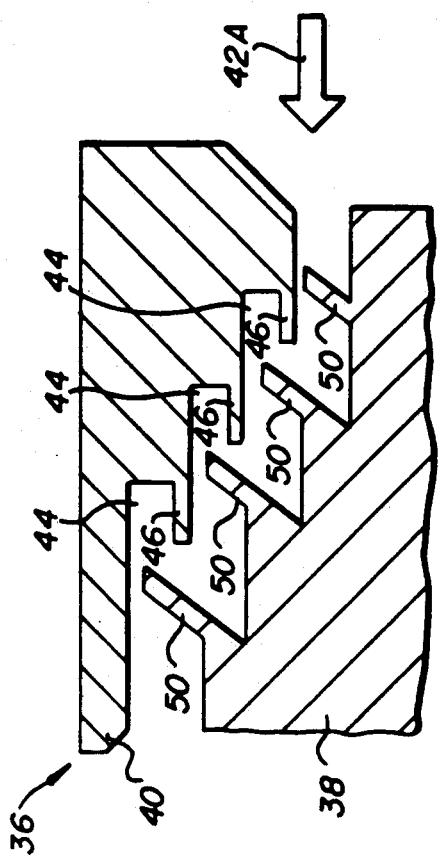
FIG. 1 illustrates a cross-sectional view of a prior art staggered-type labyrinth seal.

Reference is now made in detail to the drawings in which identical or similar elements are designated by the same reference numerals.

FIGS. 1, 1A, 2, and 3 illustrate prior art seal systems.

Figure 9:
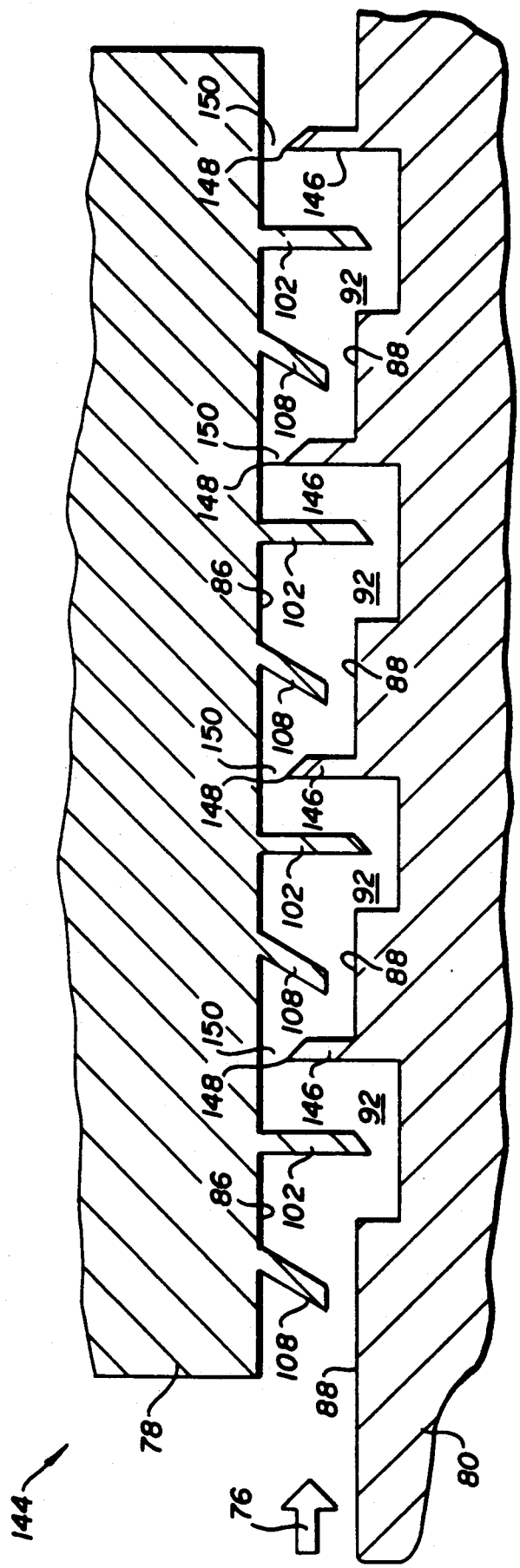
FIG. 9 illustrates in schematic cross-section a labyrinth seal having straight long teeth and slanted short teeth extending from a stator seal element and straight teeth extending from a staggered rotor.
Figure 10:
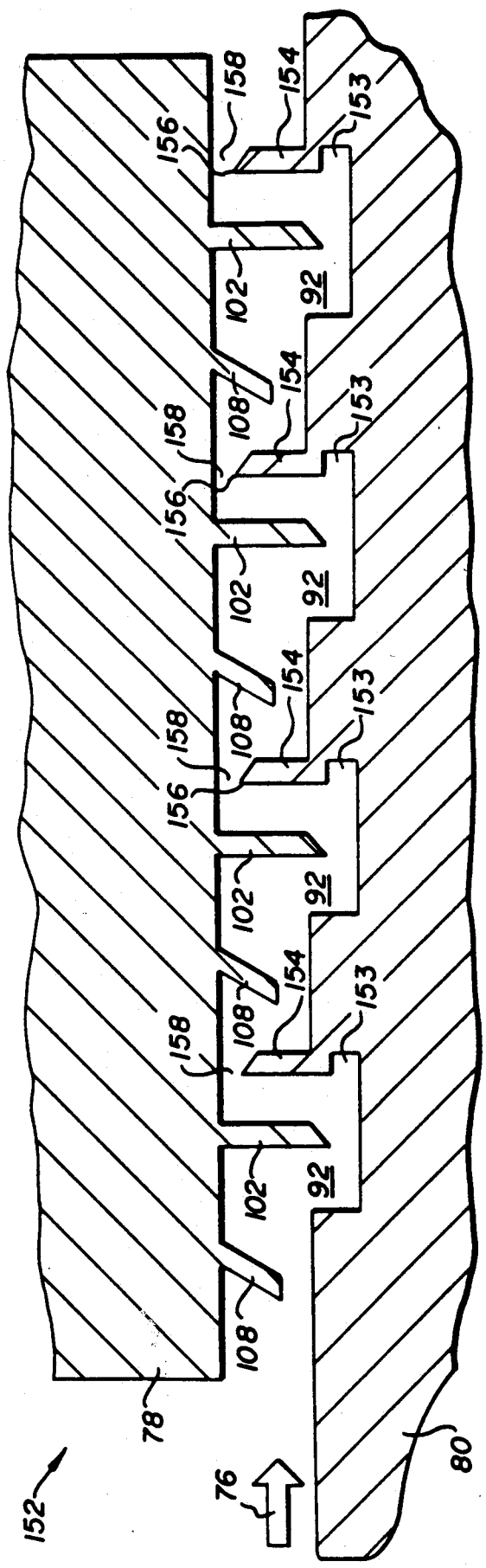
FIG. 10 illustrates in schematic cross-section a labyrinth seal having straight long teeth and slanted short teeth extending from a stator seal element and straight teeth extending from an undercut staggered rotor.

FIG. 1 illustrates a prior art staggered type labyrinth seal 10 shown as the earlier mentioned second type of staggered-type labyrinth seal of FIG. 9 of the Egli publication. Seal 10 includes a seal element 12 and a seal element 14 between which passes a compressible fluid. Seal element 14 defines three cavities 18 which extend around cylindrical surface 16 perpendicular to the axis of rotation. Cavities 18 have cylindrical bottom walls 20 which are parallel to axis of rotation 13. Three long teeth 22 are connected to a cylindrical surface 24 of seal element 12. Cylindrical surfaces 16 and 24 are spaced from one another so as to avoid rubbing between seal element 12 and seal element 14. Long teeth 22 are perpendicular from surface 24 and extend to a location spaced away from bottom walls 20 so as to define a throttling clearance 26 therebetween. Four short teeth 28 connected to cylindrical surface 16 are oriented perpendicular to axis of rotation 13 to a location spaced away from cylindrical surface 16 so as to define a throttling clearance 30 therebetween. Throttling clearances 26 and 30 pass a compressible fluid such as a gas or steam in a jet stream so as to minimize leakage flow through seal 10.

Figure 1A:
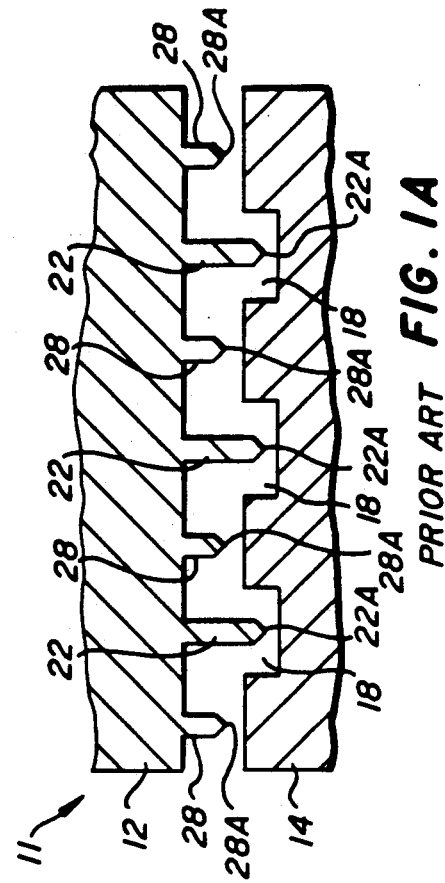
FIG. 1A illustrates a cross-sectional view of a prior are staggered-type labyrinth seal analogous to the seal shown in FIG. 1.

FIG. 1A illustrates a prior art staggered type labyrinth seal 11 analogous to the seal illustrated in FIG. 1. Long teeth 22 and short teeth 28 have teeth tips 22A and 28A, respectively, which are slanted in opposite directions so that the teeth have centrally located sharp edges that extend around the seal.

Figure 3:
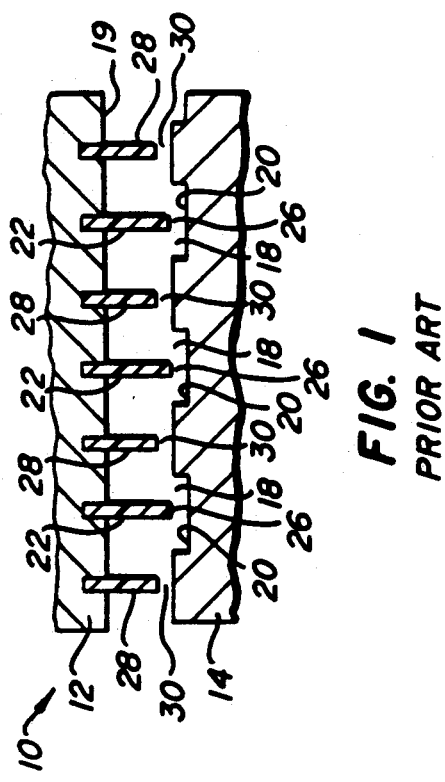
FIG. 3 illustrates a cross-sectional view of a prior art seal for a small-to-large diameter seal.
Figure 2:
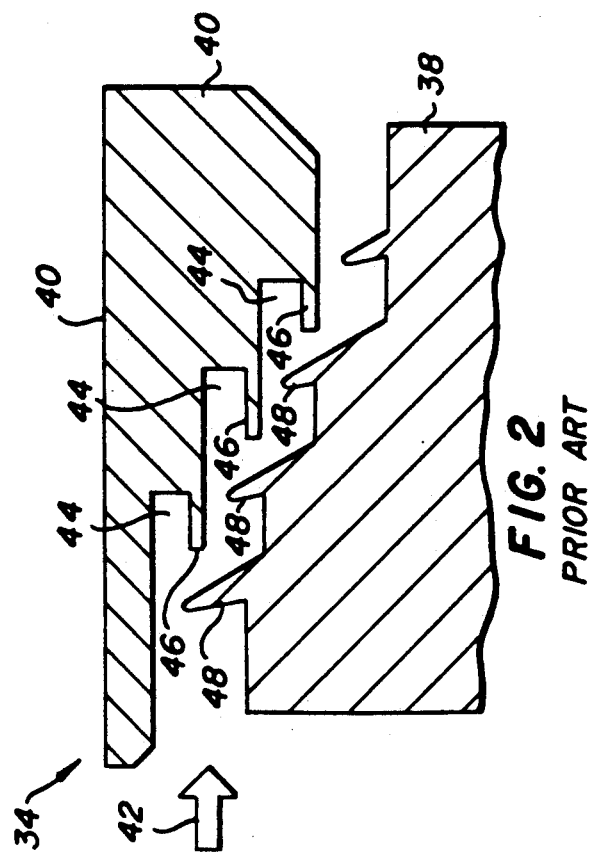
FIG. 2 illustrates a cross-sectional view of a prior art seal for a large-to-small diameter seal.

FIGS. 2 and 3 illustrate prior art large-to-small diameter and small-to-large diameter labyrinth seal systems 34 and 36, respectively. Both seal systems 34 and 36 include a rotor seal element 38 rotatable about an axis of rotation and a stator seal element 40 mounted to and cylindrically stepped between large diameter and small diameter stator and rotor portions of a machine. Leakage flow of a gas or steam in seal system 34 is indicated by arrow 42 and in seal system 36 by arrow 42A. Three notches, or undercuts, 44 defined in the steps of each stator seal element 40 by lips 46 open in the direction of the large diameter end. Four teeth 48 connected to rotor seal element 38 are slanted in the upstream direction relative to the direction of leakage flow 42 in FIG. 2, and four teeth 50 connected to rotor seal element 38 are likewise slanted in the upstream direction of leakage flow 42A in FIG. 3. The tips of slanted teeth 48 and 50 define throttling clearances between the steps of stator seal elements 40.

Figure 4:
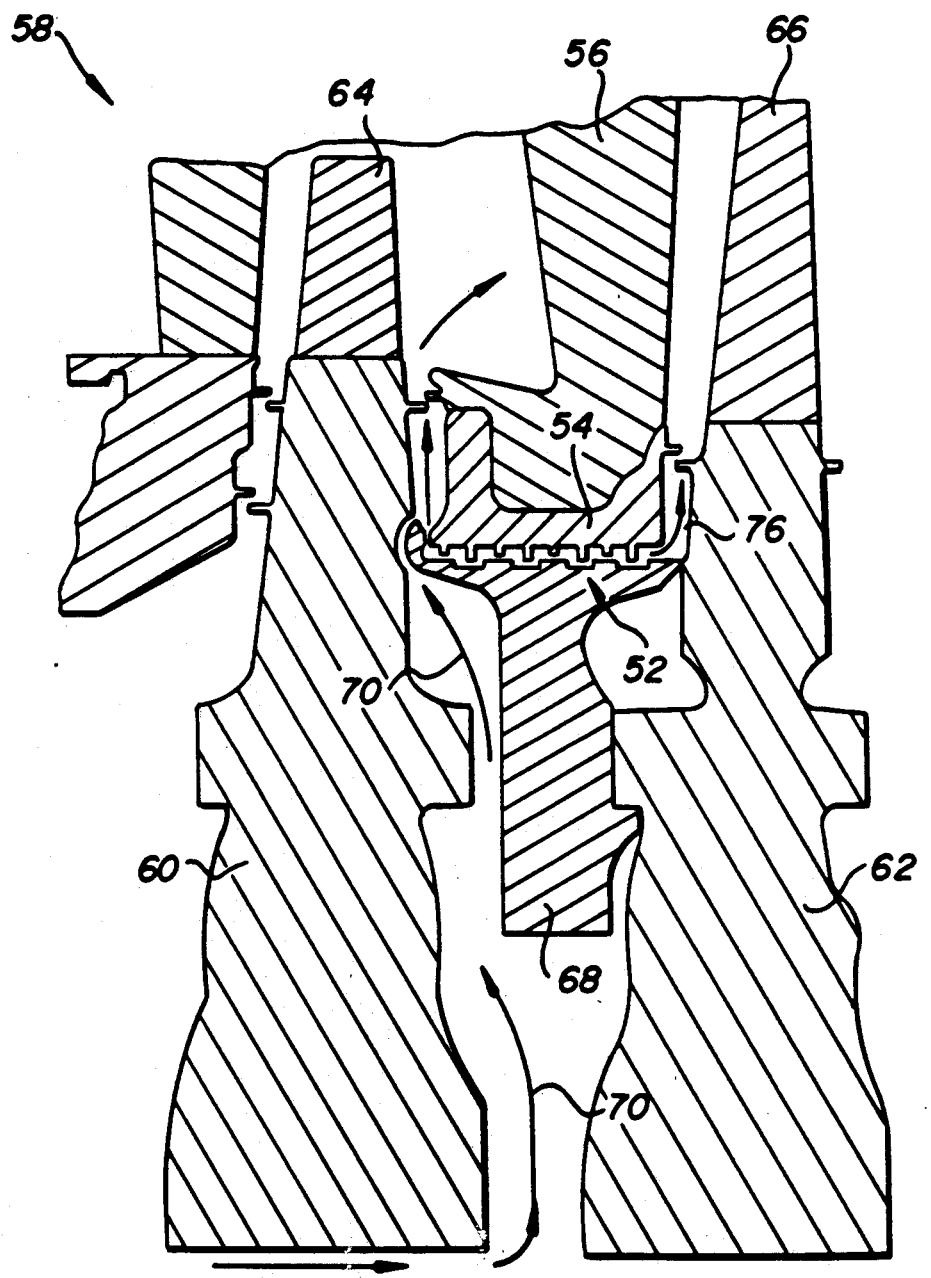
FIG. 4 is a schematic sectional side view of two stages of a gas turbine with intentional extracted cooling flow indicated through a labyrinth seal in accordance with the present invention.
Figure 5:
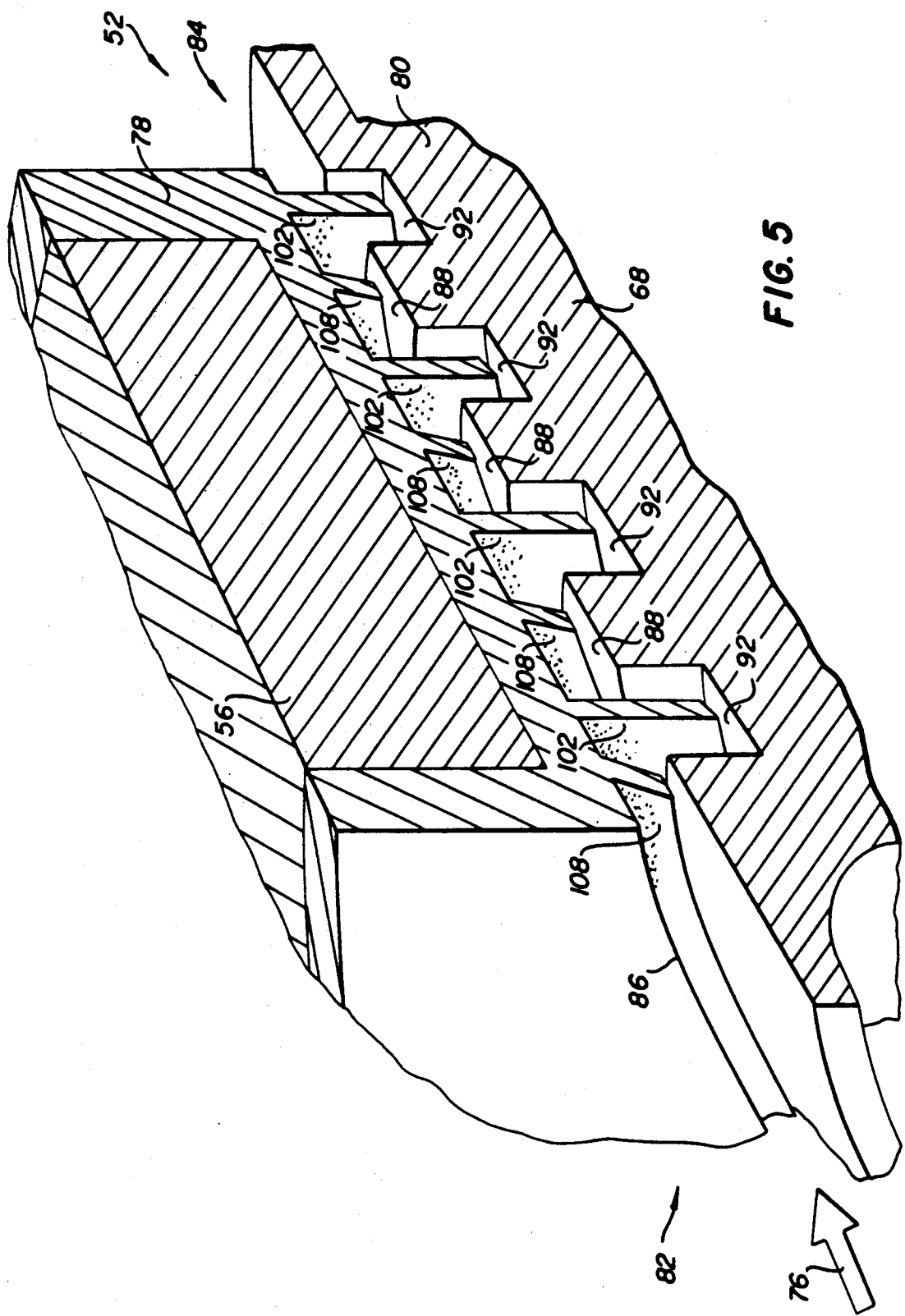
FIG. 5 is a simplified fragmented sectional perspective view of the labyrinth seal shown in FIG. 4.
Figure 6:
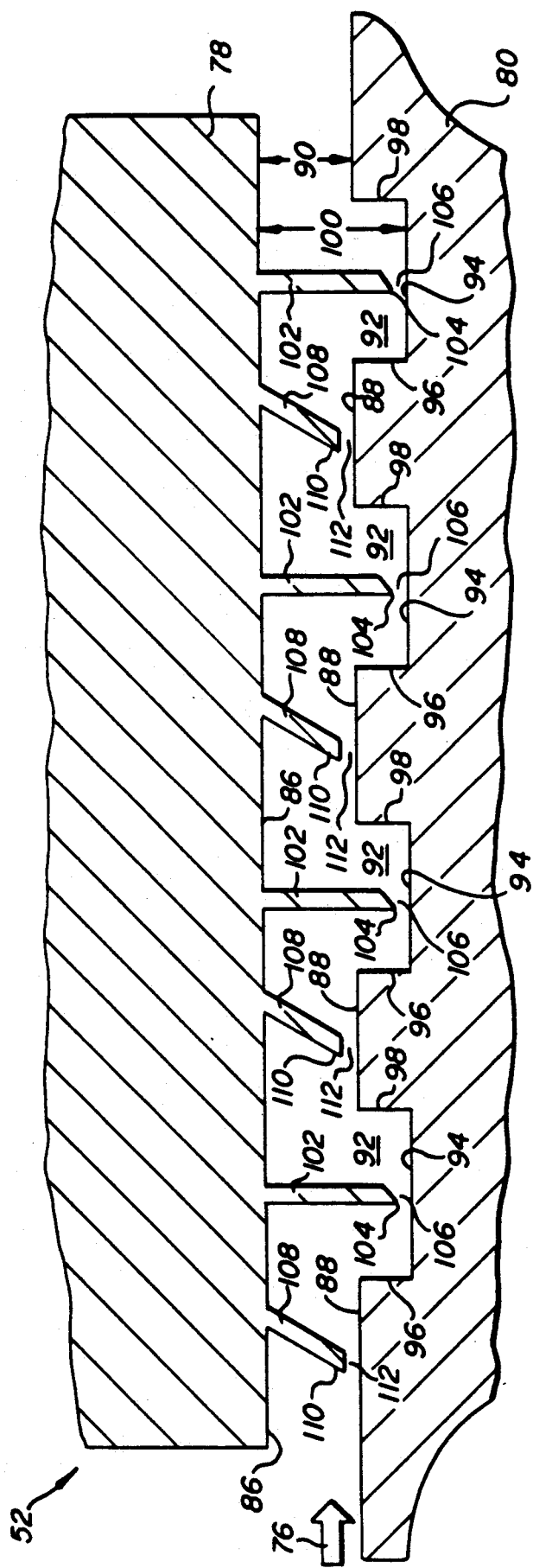
FIG. 6 illustrates in schematic cross-section the labyrinth seal shown in FIG. 5 having straight long teeth and slanted short teeth extending from a stator seal element to a staggered rotor.

A seal system 52 illustrated in FIG. 4 in an overall view and in detail in FIGS. 5 and 6 includes a seal diaphragm 54 mounted to a stationary nozzle 56 of a gas turbine 58 located between an upstream turbine wheel 60 and a downstream turbine wheel 62 each having buckets 64 and 66, respectively. A spacer 68 is connected to the forward side of downstream wheel 62. Compressor extraction cooling flow 70 enters turbine 58 through the turbine axis of rotation 71, passes radially outwardly into a cavity 72 between upstream and downstream wheels 60 and 62, further passes radially outwardly between the rearward side of upstream wheel 60 and spacer 68, and finally passes outwardly between upstream bucket 64 and downstream nozzle 73. A circular space 74 is formed between rotating spacer 68 and stationary seal diaphragm 54 through which a small intentional cooling leakage flow, indicated by an arrow 76, taken from compressor extraction cooling flow 76 passes to the forward side of downstream wheel 62. Seal system 52 is shown in detail in FIGS. 5 and 6 where seal diaphragm 54 is designated stator seal element 78 and the seal element portion of spacer 68 defined by spacer 74 is designated rotor seal element 80.

Seal system 52 minimizes leakage flow of the compressible fluid, indicated by arrow 76, from the upstream end 82 of seal system 52 to the downstream end 84 of seal system 52. The schematic rendering of FIGS. 5 and 6 includes rotor seal element 80 being surrounded by stator seal element 78 and rotating about an axis of rotation coextensive with turbine axis of rotation 71. Opposed upstream and downstream ends 82 and 84 of seal system 52 have equal diameters.

Stator seal element 78 has a cylindrical surface 86 parallel to turbine axis of rotation 71. Rotor seal element 80 has a cylindrical surface 88 also having a cylindrical axis coextensive with turbine axis of rotation 71 and is spaced from cylindrical surface 86 at a radial distance 90 so as to avoid rubbing between stator seal element 78 and rotor seal element 80.

Four cavities 92 defined by rotor seal element 80 extend around rotor seal element 80 perpendicular to axis of rotation 71 at intervals with apertures at cylindrical surface 88. The number of and axial distance between cavities 92 can vary in accordance with particular requirements of a seal system. Each cavity 92 is in particular defined by a cylindrical bottom wall 94 aligned with cylindrical surface 88 and opposed radially aligned upstream and downstream walls 96 and 98, respectively. Cavities 92 increase the turbulence of fluid flow 76. Cylindrical bottom wall 94 is spaced from cylindrical surface 86 of stator seal element 78 at a radial distance 100 greater than distance 90.

Four long teeth 102 connected to stator seal element 78 extending from cylindrical surface 86 oriented perpendicular to turbine axis of rotation 71 have sharp-edged tips 104 which define throttling clearances 106 with rotor seal element cylindrical surface 88. Four short teeth 108 connected to and extending around cylindrical surface 86 of stator seal element 78 oriented perpendicular to axis of rotation 71 have sharp-edged tips 110 which define throttling clearances 112 with cylindrical surface 88 of rotor seal element 80. Short teeth 88 are slanted in the upstream direction relative to the direction of leakage fluid flow 76. The bases at cylindrical surface 86 of all long teeth 82 and short teeth 88 are pitched, or spaced apart, from one another at generally equal intervals as shown, but these intervals can vary in accordance with particular conditions. Cylindrical surface 88, because it is interrupted by cavities 92, is isolated into three center portions and two opposed end portions. Each tip 90 of the three center short teeth of teeth 88 is positioned at the general center of each of the three center portions of cylindrical surface 88. Each throttling clearance 86 and 92 passes leakage flow in a jet stream into the downstream space so as to substantially eliminate the kinetic energy of the fluid passed.

Figure 7:
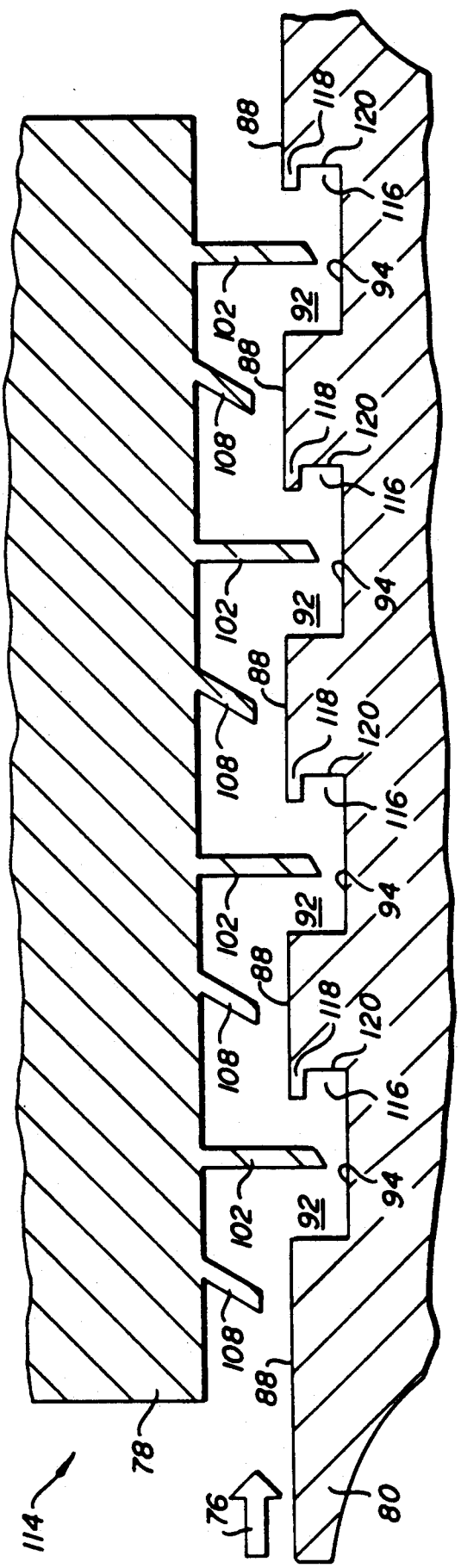
FIG. 7 illustrates in schematic cross-section a labyrinth seal having straight long teeth and slanted short teeth extending from a stator seal element to a undercut staggered rotor.

FIG. 7 illustrates another embodiment of the invention, namely, seal system 114, which includes the basic elements of seal system 52 described above and as illustrated in FIGS. 4, 5, and 6. Seal system 114 further includes a notch, or undercut, 116 opening at each downstream side wall 98A of each cavity 92. In particular, each undercut 116 is defined by a lip 118 coextensive with cylindrical surface 88 of rotor seal element 80, a radially aligned wall 120, and a cylindrical bottom wall 122 coextensive with bottom wall 94 of each cavity 92. The presence of undercuts 116 results in an increase in the turbulence of fluid 76 within cavities 92.

Figure 8:
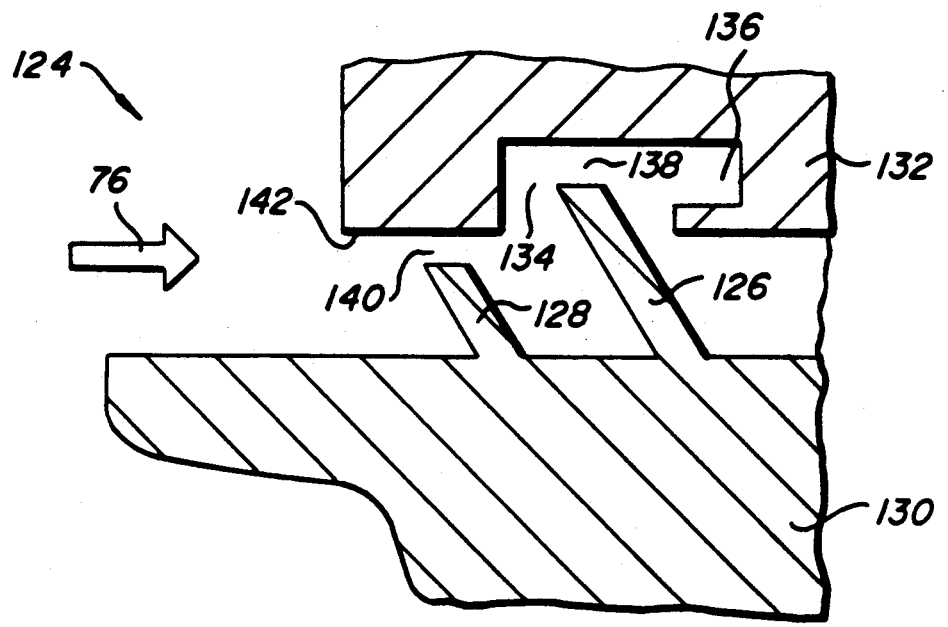
FIG. 8 illustrates in fragmented schematic cross-section a labyrinth seal having slanted long teeth and slanted short teeth extending from a rotor to an undercut staggered stator seal element.

FIG. 8 illustrates another embodiment of the invention, namely, seal system 124, which includes long teeth 126 and short teeth 128 connected to a rotor seal element 130. Long and short teeth 126 and 128 are slanted in the direction of fluid flow 58. Only one long tooth 126 and one short tooth are shown but represent a plurality of slanted long and short teeth. Seal system 124 includes a stator seal element 132, which defines a plurality of cavities represented by cavity 134. An undercut 136 is formed by stator seal element 132 at the downstream wall of cavity 134. Long tooth 126 defines a throttling clearance with the cylindrical bottom wall of cavity 134, and short tooth 128 defines a throttling clearance 140 with the cylindrical surface 142 of stator seal element 132.

FIG. 9 illustrates another embodiment of the invention, namely, seal system 144, which includes the basic elements of seal system 52 described above and as illustrated in FIG. 6. Seal system 144 further includes four rotor seal element teeth 146 connected to cylindrical surface 88 of rotor seal element 80 and extending around rotor seal element 80 oriented perpendicular to axis of rotation 71. In particular, rotor seal element teeth 146 are connected at their bases to downstream side walls 98. Rotor seal element teeth 146 have sharp-edged tips 148 which define throttling clearances 150 with cylindrical surface 86 of stator seal element 78. Rotor seal element teeth 146, long teeth 102, and short teeth 108 are spaced apart at their bases. Throttling clearances 150 further reduce the kinetic energy of leakage flow 76.

FIG. 1 illustrates another embodiment of the invention, namely, seal system 152, analogous to seal system 114 as illustrated in FIG. 7. Undercuts 153 are defined by rotor seal element 80 st the downstream wall of cavities 92. Four rotor seal element teeth 154 connected to cylindrical surface 88 of rotor seal element 80 at undercuts 153 extend around cylindrical surface 88 of rotor seal element 80 oriented perpendicular to axis of rotation 71 at lips 118 of undercuts 116. Rotor seal element teeth 154 have sharp-edged tips 156 defining throttling clearances 158 with cylindrical surface 86 of stator seal element 78. Throttling clearances 158 further reduce the kinetic energy of leakage flow 76.

Figure 11:
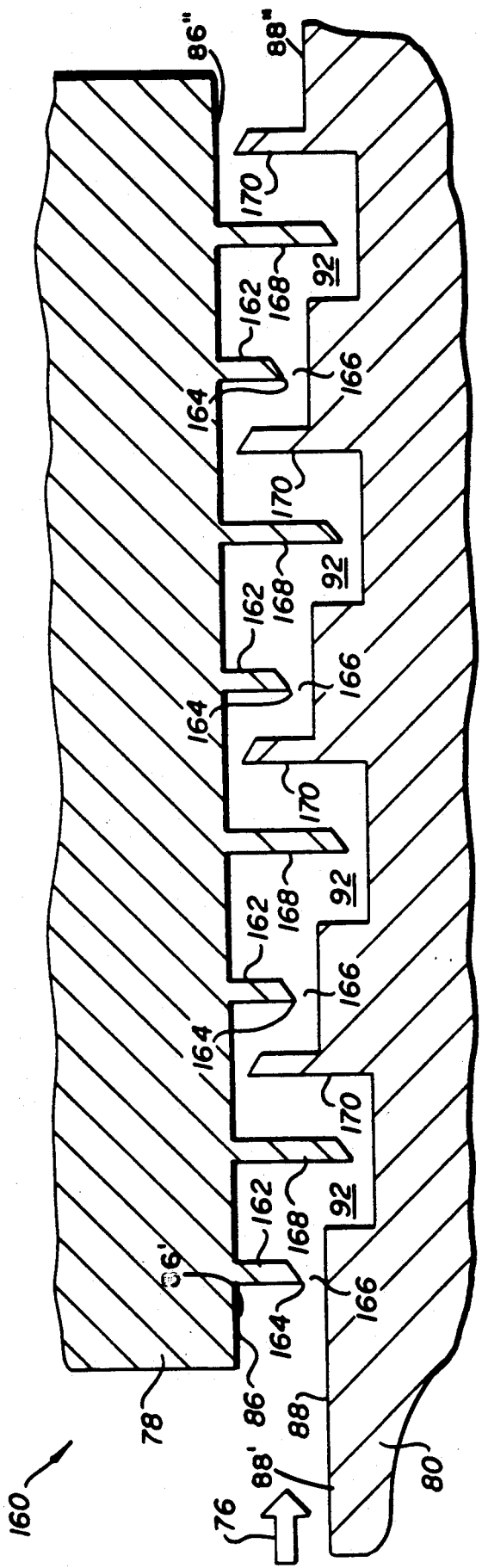
FIG. 11 illustrates in schematic cross-section a labyrinth seal having straight long teeth and straight short teeth extending from a stator seal element and straight teeth extending from a staggered rotor.

FIG. 11 illustrates another embodiment of the invention, namely, seal system 160, which includes four short straight teeth 162 connected to and extending around cylindrical surface 86 of stator seal element 78 oriented perpendicular to axis of rotation 71 having sharp-edged tips 164 which define throttling clearances 166 with cylindrical surface 88 of rotor seal element 80. Short teeth 162 are oriented perpendicular to axis of rotation 71. Seal system 160 includes four long teeth 168 analogous to long teeth 102 of seal system 52 and four rotor seal element teeth 170 analogous to teeth 146 of seal system 144. Cylindrical surface 88, because it is interrupted by cavities 92, is isolated into three center portions and two end portions. Each tip 164 of the three center short teeth of short teeth 170 is positioned at the general center of each of the three center portions of cylindrical surface 88. Each throttling clearance 86 and 126 passes leakage flow 76 in a jet stream into a downstream space so as to substantially eliminate the kinetic energy of the fluid passed. In the embodiment illustrated in FIG. 11, the seal element 78 includes a cylindrical surface 86 which has upstream and downstream ends 86', 86'', respectively, which have the same diameters as defined by the cylindrical surface 86. Similarly, the seal element 80 has a cylindrical surface 88 which includes upstream and downstream ends 88', 88'', respectively, which have the same diameters as defined by the cylindrical surface 88.

Figure 12:
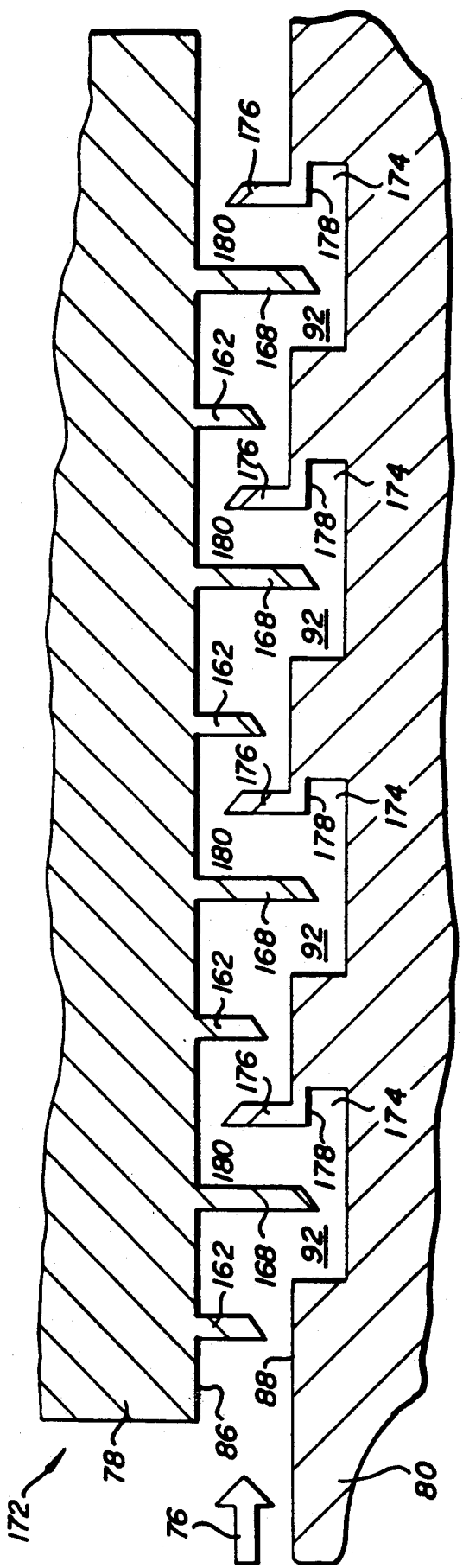
FIG. 12 illustrates in schematic cross-section a labyrinth seal having straight long teeth and straight short teeth extending from a stator seal element and straight teeth extending from an undercut staggered rotor.

FIG. 12 illustrates another embodiment of the invention, namely, seal system 172, which is analogous to seal system 160 as illustrated in FIG. 11 and including undercuts 174 at the downstream wall of cavities 92. Four straight rotor seal element teeth 176 analogous to rotor seal element teeth 170 of seal system 160 are connected to lips 178 of undercuts 174 and extend around cylindrical surface 88 of rotor seal element 80 oriented perpendicular to axis of rotation 71. Rotor seal element teeth 174, long teeth 168, and short teeth 170 are spaced apart at their bases from one another. Rotor seal element teeth 176 define throttling clearances 180 with cylindrical surface 86 of stator seal element 78. The throttling clearances of seal system 172 pass leakage flow 76 in a jet stream into a downstream space so as to substantially eliminate the kinetic energy of the fluid passed.

Figure 13:
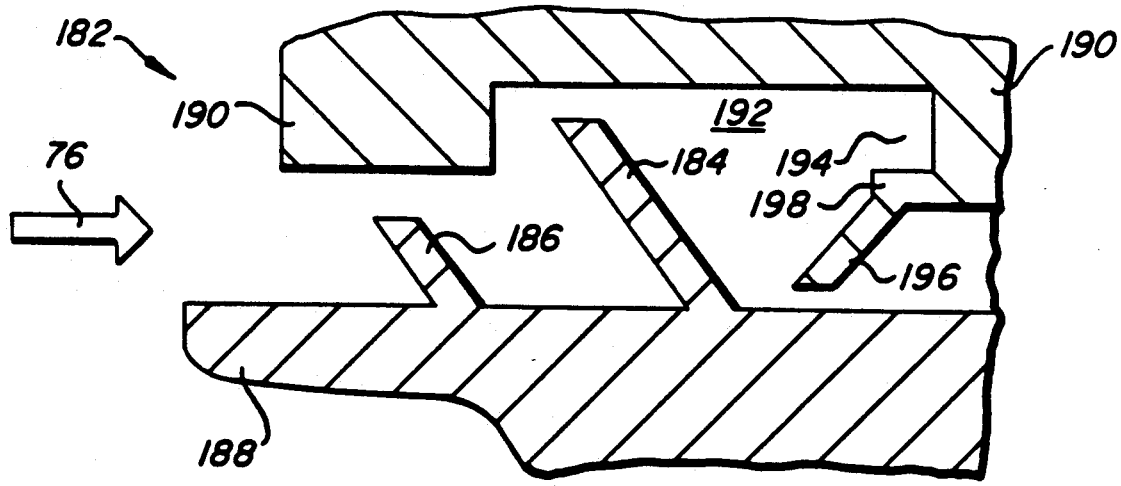
FIG. 13 illustrates in fragmented schematic cross-section a labyrinth seal having slanted long teeth and slanted short teeth extending from a rotor and slanted teeth extending from an undercut staggered stator seal element.

FIG. 13 illustrates another embodiment of the invention, namely, seal system 182, which includes long teeth 184 and short teeth 186 each representing a plurality of teeth connected to a rotor seal element 188, which rotates about turbine axis of rotation 71. Long and short teeth 184 and 186 are slanted upstream relative to the direction of leakage flow 76. Seal system 182 includes a stator seal element 190, which defines a plurality of cavities represented by cavity 192. An undercut 194 is formed by stator seal element 190 at the downstream side of cavity 192. A stator tooth 196 representing a plurality of stator teeth is connected to stator seal element 190 at the lip 198 of undercut 194. Stator tooth 196 is slanted upstream relative to the direction of leakage flow 76. Long teeth 184 define throttling clearances with the cylindrical bottom walls of cavities 192, short teeth 186 define throttling clearances with the cylindrical surface of rotor seal element 188, and rotor teeth 196 define throttling clearances with the cylindrical surface of stator seal element 190. The throttling clearances of seal system 182 pass leakage flow 76 in a jet stream into a downstream space so as to substantially eliminate the kinetic energy of the fluid passed.

The sealing systems described hereinabove have opposed upstream and downstream ends of the same diameter. The sealing systems described hereinabove can be applied to seal rotor seal elements and stator seal elements for many applications other than for spacer 68 and nozzle 73 of gas turbine 58. These applications can include, for example, seals having opposed ends having different diameters as described below FIG. 14 illustrates a seal system 202 having a stator seal element 204 having opposed upstream and downstream ends 206 and 208, respectively, and a rotor seal element 210 having opposed upstream and downstream ends 212 and 214, respectively. Upstream ends 206 and 212 have smaller diameters than downstream ends 208 and 214. Leakage flow 216 enters seal system 202 at the small diameter ends 206 and 212 and passes through the seal to the large diameter ends 208 and 214. The surface of stator seal element 204 extends between upstream and downstream ends 206 and 208 by four cylindrical increments 222 having cylindrical surface parallel with the axis of rotation of the machine so as to adjust in three stages the diameter differences. Likewise, the surface of rotor seal element 210 extends between upstream and downstream ends 212 and 214 by four cylindrical increments 224 having cylindrical surfaces parallel with the axis of rotation so as to adjust in three stages the diameter differences. The surfaces of increments 222 and 224 are spaced from one another. Three ring-shaped steps 226 configured as radially aligned walls extend between increments 222 of stator seal element 204, and three ring-shaped steps 228 configured as radially aligned walls extend between increments 224 of rotor seal element 206. Optional undercuts 229 are defined at the areas of radially aligned walls 228.

Teeth 230 connected to stator seal element 204 at increments 222 define throttling clearances with increments 224 so as to substantially eliminate the kinetic energy of the leakage flow passed. Teeth 232 connected to rotor seal element 210 at increments 224 positioned at steps 228 define throttling clearances with increments 222 so as to substantially eliminate the kinetic energy of the leakage flow passed.

Stator teeth 230 and rotor teeth 232 are oriented perpendicular to the direction of leakage flow 216. Alternatively, the stator teeth and rotor teeth can be angled in the upstream direction relative to the direction of leakage flow.

FIG. 15 illustrates a seal system 20 analogous to seal system 202 having leakage flow 236 entering the seal system from the large diameter side and passing to the low diameter side. Teeth 240 connected to stator seal element 204 at increments 222 define throttling clearances with incrementals 224 so as to substantially eliminate the kinetic energy of the leakage flow passed. Teeth 242 connected to rotor seal element 206 at increments 224 positioned at undercuts 238 define throttling clearances with increments 222 so as to substantially eliminate the kinetic energy of the leakage flow passed.

Stator teeth 240 and rotor teeth 242 are oriented perpendicular to the direction of leakage flow 236. Alternatively, the stator teeth and rotor teeth can be angled in the upstream direction relative to the direction of leakage flow as indicated in phantom line.

The schematic rendering of FIG. 6 shows rotor 80 being surrounded by stator seal element 78. Alternatively, a stator can be surrounded by a rotor, and the various seal systems described herein can be arranged to conform to such a configuration.

The number of and distance between the teeth described herein can vary in accordance with particular requirements of a seal system.

The labyrinth seals described herein substantially reduce the amount of leakage flow of a compressible gas between the stationary and rotating parts of a gas turbo-machine. Furthermore, the leakage flow reduction is accomplished without significant decrease in the axial clearance of the seal and without increase in the axial length of the seal. As set forth in the descriptions of the several seal systems above, this is accomplished in part by adding a number of teeth on either the rotating or stationary elements or both of the seal. In addition, seal systems are configured in certain combinations of slanted and straight teeth with staggered recesses. The teeth can be applied in basic systems to both straight-through leakage flow and large-to-small or small-to-large diameter leakage flow.

The embodiments of the invention particularly disclosed and described herein are presented merely as an example of the invention. Other embodiments, forms, and modifications of the invention coming within the proper scope and spirit of the appended claims will, of course, readily suggest themselves to those skilled in the art.

What is claimed is:

1. A seal system for reducing leakage flow of a compressible fluid between a rotating portion of a machine rotating relative to a stationary portion of the machine, comprising, in combination,
   a first seal element having a first cylindrical surface, said first seal element being adapted to be connected to one of the portions of the machine,
   a second seal element having a second cylindrical surface at a first radial distance, said second seal element being adapted to be connected to the other of the portions of the machine,
   a third cylindrical surface defined by said first seal element spaced from said second cylindrical surface at a second radial distance greater than said first radial distance, said third cylindrical surface and said first seal element defining cavity means for increasing turbulence of the leaking flow,
   first throttling means connected to said second cylindrical surface of said second seal element and extending toward said third cylindrical surface to define a first throttling clearance with said third cylindrical surface for passing leakage flow so as to substantially eliminate the kinetic energy of the leakage flow passed, second throttling means connected to said second cylindrical surface of said second seal element and extending toward said first cylindrical surface to define a second throttling clearance with said first cylindrical surface for passing leakage flow so as to substantially eliminate the kinetic energy of the leakage flow passed, and third throttling means connected to said first cylindrical surface of said first seal element and extending toward said second cylindrical surface to define a third throttling clearance with said second cylindrical surface for passing leakage flow so as to substantially eliminate the kinetic energy of the leakage flow passed.

2. The seal system according to claim 1, wherein said cavity means has opposed upstream and downstream sides relative to the direction of leakage flow, and further including undercut means defined by said first seal element on said downstream side, said undercut means being for further increasing turbulence of the leakage flow within said cavity means.

3. The seal system according to claim 2, wherein said third throttling means is connected to said first cylindrical surface of said first seal element at said undercut means.

4. The seal system according to claim 2, wherein said undercut means includes said first seal element defining an undercut at said downstream side wall of each of said plurality of cavities, each said undercut being defined by a lip coextensive with said first cylindrical surface, a downstream undercut side wall, and an undercut bottom wall in alignment with said cavity bottom wall.

5. The seal system according to claim 4, wherein said third throttling means includes a plurality of third teeth connected to said first seal element at said lip, each of said plurality of third teeth having a third tip defining said third throttling clearance with said second cylindrical surface.

6. The seal system according to claim 5, wherein said plurality of third teeth are slanted upstream relative to the direction of leakage flow.

7. The seal system according to claim 1, wherein said first throttling means includes a plurality of first teeth connected to and extending around said second cylindrical surface of said second seal element, each of said plurality of first teeth including a first tip spaced from said third cylindrical surface of said first seal element, said first tip and said third cylindrical surface defining said first throttling clearance.

8. The seal system according to claim 7, wherein said second throttling means includes a plurality of second teeth connected to and extending around said second cylindrical surface of said second seal element, each of said plurality of second teeth including a second tip spaced from said first cylindrical surface, said second tip and said first cylindrical surface defining said second throttling clearance, said second teeth being slanted upstream relative to the direction of leakage flow.

9. The seal system according to claim 7, wherein said plurality of first teeth are oriented perpendicular to the direction of leakage flow.

10. The seal system according to claim 7, wherein said plurality of first teeth are slanted upstream relative to the direction of leakage flow.

11. The seal system according to claim 7, wherein said second throttling means includes a plurality of second teeth connected to and extending around said second cylindrical surface of said second seal element, each of said plurality of second teeth including a second tip spaced from said first cylindrical surface, said second tip and said first cylindrical surface defining said second throttling clearance.

12. The seal system according to claim 11 wherein said third throttling means includes a plurality of third teeth connected to said first seal element, each of said plurality of third teeth having a third tip defining said third throttling clearance with said second cylindrical surface.

13. The seal system according to claim 12 wherein said pluralities of first, second and third teeth extend substantially perpendicular to the direction of leakage flow.

14. The seal system according to claim 1, wherein said cavity means includes said first seal element defining a plurality of spaced cavities extending around said first cylindrical surface, each of said plurality of cavities being defined by said third cylindrical surface and opposed upstream and downstream side walls located relative to the direction of leakage flow.

15. The seal system according to claim 1, wherein said third throttling means includes a plurality of third teeth oriented perpendicular to the direction of leakage flow.

16. The seal system according to claim 1, wherein said first seal element is a rotor seal element and said second seal element is a stator seal element.

17. The seal system according to claim 1, wherein said first seal element is a stator seal element and said second seal element is a rotor seal element.

18. The seal system according to claim 1, wherein said first seal element has opposed first upstream and first downstream cylindrical ends having the same diameters defined by said first cylindrical surface, and said second seal element has opposed second upstream and second downstream cylindrical ends having the same diameters defined by said second cylindrical surface.

19. A seal system for reducing leakage flow of a compressible fluid between a rotating portion of a machine rotating relative to a stationary portion of the machine, comprising, in combination,
  a first seal element having a first cylindrical surface, said first seal element being adapted to be connected to one of the portions of the machine,
  a second seal element having a second cylindrical surface parallel to and spaced from said first cylindrical surface at a first radial distance, said second seal element being connected to the other of said portions of the machine,
  a third cylindrical defined by said first seal element spaced from said second cylindrical surface at a second radial distance greater than said first radial distance, said third cylindrical surface and said first seal element defining cavity means for increasing turbulence of the leakage flow,
  first throttling means connected to said second cylindrical surface of said second seal element and extending toward said third cylindrical surface to define a first throttling clearance with said third cylindrical surface for passing leakage flow so as to substantially eliminate the kinetic energy of the leakage flow passed,
  second throttling means connected to said second cylindrical surface of said second seal element and extending toward said first cylindrical surface to define a second throttling clearance with said first cylindrical surface for passing leakage flow so as to substantially eliminate the kinetic energy of the leakage flow passed, and
  third throttling means connected to said first seal element at said cavity means and extending toward said second cylindrical surface to define a third throttling clearance with said second cylindrical surface for reducing the kinetic energy of the leakage flow passed.

20. The seal system according to claim 19, wherein said cavity means has opposed upstream and downstream sides relative to the direction of leakage flow, and further including undercut means defined by said first seal element on said downstream side, said undercut means being for further increasing turbulence of the leakage flow within said cavity means.

21. The seal system according to claim 20, wherein said first throttling means includes a plurality of first teeth connected to and extending around said second cylindrical surface of said second seal element, each of said plurality of first teeth including a first tip spaced from said third cylindrical surface of said first seal element, said first tip and said third cylindrical surface defining said first throttling clearance.

22. The seal system according to claim 21, wherein said second throttling means includes a plurality of second teeth connected to and extending around said second cylindrical surface of said second seal element, each of said plurality of second teeth including a second tip spaced from said first cylindrical surface, said second tip and said first cylindrical surface defining said second throttling clearance, said second teeth being slanted upstream relative to the direction of leakage flow.

23. The seal system according to claim 22, wherein said cavity means includes said first seal element defining a plurality of spaced cavities extending around said first cylindrical surface, each of said plurality of cavities being defined by a cylindrical bottom wall and opposed upstream and downstream side walls located relative to the direction of leakage flow.

24. The seal system according to claim 23, wherein said undercut means includes said first seal element defining an undercut at said downstream side wall of each of said plurality of cavities, each said undercut being defined by a lip coextensive with said first cylindrical surface, a downstream undercut side wall, and an undercut bottom wall in alignment with said cavity bottom wall.

25. The seal system according to claim 24, wherein said third throttling means includes a plurality of third teeth connected to said first seal element at said lip, each of said plurality of third teeth having a third tip defining a third throttling clearance with said second cylindrical surface.

26. The seal system according to claim 25, wherein said plurality of first teeth are oriented perpendicular to the direction of leakage flow.

27. The seal system according to claim 25, wherein said plurality of second teeth are oriented perpendicular to the direction of leakage flow.

28. The seal system according to claim 25, wherein said plurality of first teeth are slanted upstream relative to the direction of leakage flow.

29. The seal system according to claim 25, wherein said plurality of second teeth are slanted upstream relative to the direction of leakage flow.

30. The seal system according to claim 25, wherein said plurality of third teeth are oriented perpendicular to the direction of leakage flow.

31. The seal system according to claim 25, wherein said plurality of third teeth are slanted upstream relative to the direction of leakage flow.

32. The seal system according to claim 19, wherein said first seal element is a rotor seal element and said second seal element is a stator seal element.

33. The seal system according to claim 19, wherein said first seal element is a stator seal element and said second seal element is a rotor seal element.

34. The seal system according to claim 19, wherein said first seal element has opposed first upstream and first downstream cylindrical ends having the same diameters defined by said first cylindrical surface, and said second seal element has opposed second upstream and second downstream cylindrical ends having the same diameters defined by said second cylindrical surface.

* * * * *